(12) United States Patent
Kagami et al.

(10) Patent No.: US 10,075,022 B2
(45) Date of Patent: Sep. 11, 2018

(54) COIL UNIT AND POWER SUPPLYING SYSTEM

(71) Applicant: Yazaki Corporation, Tokyo (JP)

(72) Inventors: Kazuyoshi Kagami, Susono (JP); Hajime Terayama, Susono (JP); Shingo Tanaka, Yokosuka (JP)

(73) Assignee: Yazaki Corporation, Tokyo (JP)

( * ) Notice: Subject to any disclaimer, the term of this patent is extended or adjusted under 35 U.S.C. 154(b) by 203 days.

(21) Appl. No.: 14/843,098

(22) Filed: Sep. 2, 2015

(65) Prior Publication Data

US 2015/0372507 A1    Dec. 24, 2015

Related U.S. Application Data

(63) Continuation of application No. PCT/JP2014/055354, filed on Mar. 4, 2014.

(30) Foreign Application Priority Data

Mar. 5, 2013 (JP) ................................. 2013-042677

(51) Int. Cl.
| | |
|---|---|
| *H02J 50/12* | (2016.01) |
| *H01F 38/14* | (2006.01) |
| *H01F 27/24* | (2006.01) |
| *H02J 5/00* | (2016.01) |
| *H02J 7/02* | (2016.01) |

(52) U.S. Cl.
CPC ............. *H02J 50/12* (2016.02); *H01F 27/24* (2013.01); *H01F 38/14* (2013.01); *H02J 5/005* (2013.01); *H02J 7/025* (2013.01)

(58) Field of Classification Search
CPC ............. H02J 5/005; H02J 50/12; H02J 7/025
USPC .......................................................... 307/104
See application file for complete search history.

(56) References Cited

U.S. PATENT DOCUMENTS

| | | | |
|---|---|---|---|
| 2010/0219791 A1* | 9/2010 | Cheng ....................... | H01F 3/02 320/108 |
| 2011/0121920 A1 | 5/2011 | Kurs et al. | |

FOREIGN PATENT DOCUMENTS

| | | |
|---|---|---|
| JP | 2008-087733 A | 4/2008 |
| JP | 2010-172084 A | 8/2010 |
| JP | 2011050127 A | 3/2011 |

(Continued)

OTHER PUBLICATIONS

International Search Report dated Jun. 17, 2014, issued for PCT/JP2014/055354.

(Continued)

*Primary Examiner* — John Poos
(74) *Attorney, Agent, or Firm* — Locke Lord LLP

(57) ABSTRACT

A power supplying system magnetically resonates between a primary resonant coil that configures a primary core unit and a secondary resonant coil that configures a secondary core unit for contactlessly supplying the power. The primary and secondary resonant coils are wound around the primary and secondary ferrite cores respectively, and face each other in the direction perpendicular to the axial direction of the primary and secondary resonant coils when supplying the power. The primary and secondary ferrite cores are divided into a plurality of portions along the axial direction of the primary and secondary resonant coils such that a width of the both end portions is shorter than a width of the center portion.

2 Claims, 5 Drawing Sheets

(56) References Cited

FOREIGN PATENT DOCUMENTS

JP 2012-200032 A 10/2012
WO WO-2011/112795 A1 9/2011

OTHER PUBLICATIONS

Office Action dated Aug. 8, 2017 issued for corresponding Japanese Patent Application No. 2013-042677.

* cited by examiner

POWER LOSS [W/m$^3$]

$1.3929e^4$
$9.6429e^3$
$4.2857e^3$

COMPARATIVE PRODUCT

COIL UNIT AND POWER SUPPLYING SYSTEM

TECHNICAL FIELD

The present invention relates to a coil unit, especially, a coil unit used for contactless power supplying and a power supplying system that performs contactless power supplying.

BACKGROUND ART

In recent years, as a power supplying system for supplying power to a battery mounted on a hybrid vehicle and an electric vehicle, wireless power supplying has been focused that does not use a power supply cord and a power transmission cable. As one of the wireless power supplying technique, that of a resonant type has been known (Patent Literatures 1, 2).

In the resonant type power supplying system, one of a pair of resonant coils (coils) electromagnetically resonant with each other is installed on the ground of a power supplying facility and the other is mounted on a vehicle, and power is contactlessly supplied from the resonant coil installed on the ground of the power supplying facility to the resonant coil mounted on the vehicle.

The resonant coil described above, for enhancing its ability, is wound around a core configured from a magnetic material such as ferrite. As the core, conventionally, it has been provided in one component. In a power supplying system for transmitting large power, however, it is necessary to increase the size of the resonant coil and core, so it is not practical to configure in one component when considering manufacturing and cost. Therefore, although it is divided into several blocks in practice, when the core is divided as described above, due to a cause such as clearance (gap), there has been a possibility that power transmission efficiency is decreased.

CITATION LIST

Patent Literatures

Patent Literature 1: JP 2008-87733 A
Patent Literature 2: JP 2012-200032 A

SUMMARY OF INVENTION

Technical Problem

Therefore, the present invention aims to provide a core unit and a power supplying system capable of suppressing decrease of power transmission efficiency even when a core is divided.

Solution to Problem

The present inventors, as a result of intensive research, have found that the decrease of the power transmission efficiency can be suppressed more when dividing the core along the axial direction of the coil than when dividing the core along the direction perpendicular to the axial direction of the coil, and have reached the present invention. Further, the present inventors, as the result of intensive research, have found that the decrease of the power transmission efficiency can be suppressed more when dividing the core such that a width of both end portions is shorter than that of a center portion than when dividing the core into equal widths, and have reached the present invention.

That is, the first aspect of the present invention is a coil unit used for a power supplying system that, when a pair of coils is separately disposed in a direction perpendicular to an axial direction of the coils, contactlessly supplies power from one coil to the other coil, the coil unit including: a flat plate-like core; and the coils wound around the core, and the core is divided into a plurality of portions along the axial direction of the coils, and the core is divided such that the width of the both end portions is shorter than the width of the center portion.

The second aspect of the present invention is a coil unit used for a power supplying system that, when a pair of coils are separately disposed in a direction perpendicular to an axial direction of the coils, contactlessly supplies power from one coil to the other coil, the coil unit including: a flat plate-like core; and a coil wound around the core, and the core is divided such that the width of the both end portions is shorter than the width of the center portion.

The third aspect of the present invention is a power supplying system including a pair of the coil units according to the first aspect, configured to perform contactless power supplying between the pair of the coil units.

The fourth aspect of the present invention is a power supplying system including a pair of the coil units according to the second aspect, configured to perform contactless power supplying between the pair of the coil units.

Advantageous Effect of Invention

As described above, according to the first to fourth aspects of the present invention, decrease of power transmission efficiency can be suppressed even when dividing a core.

DESCRIPTION OF EMBODIMENTS

Reference Example

Figure 1:
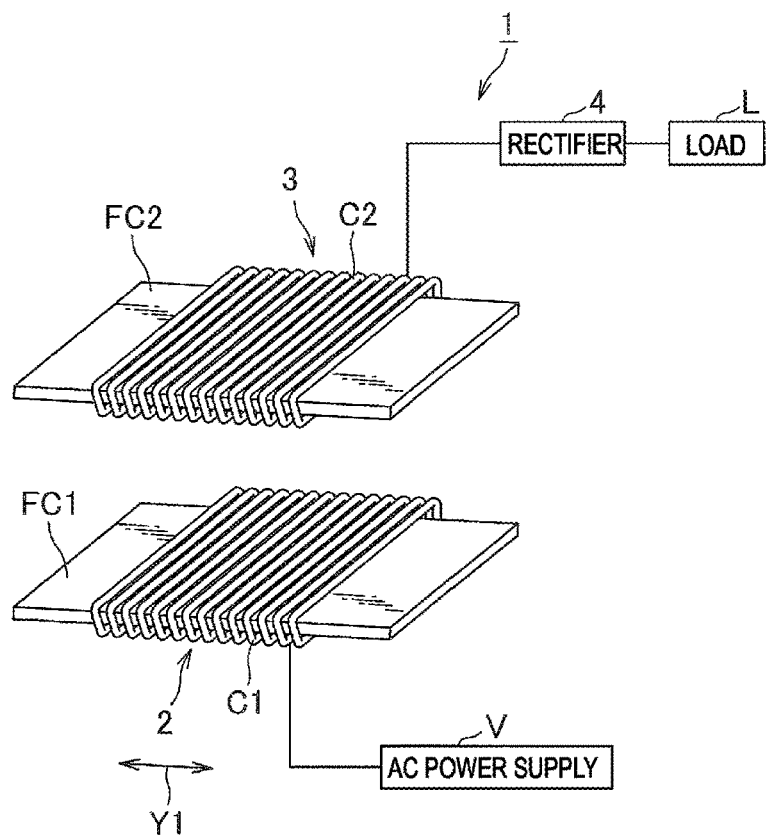
FIG. 1 is a perspective view illustrating one embodiment of a power supplying system of the present invention.
Figure 2:
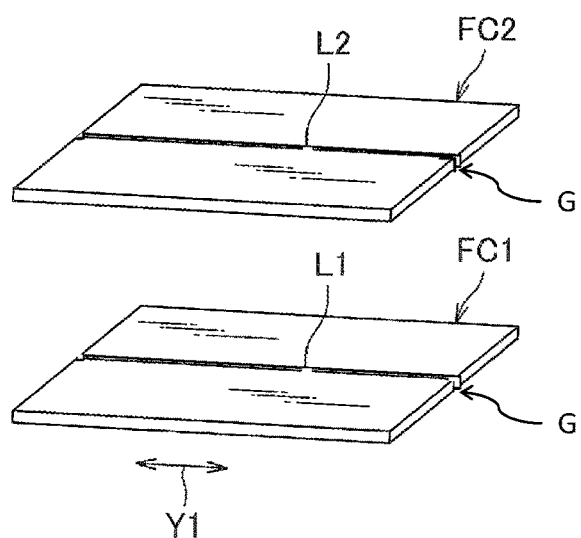
FIG. 2 is a perspective view of a core illustrated in FIG. 1 in a reference example.

Hereinafter, a power supplying system of the present invention will be described with reference to FIG. 1 and FIG. 2. As illustrated in FIG. 1 and FIG. 2, a power supplying system 1 includes a primary core unit 2 that is mounted on the ground of a power source supplying facility in which an AC power supply V is provided and contactlessly supplies power from the AC power supply V, and a secondary core unit 3 that is mounted on a vehicle and contactlessly receives the power from the primary core unit 2 for supplying the power to a load L such as a battery.

The primary core unit 2, as illustrated in FIG. 1, includes a flat plate-like primary ferrite core FC1, a primary resonant coil C1 wound around the primary ferrite core FC1, and a primary capacitor (not illustrated) connected to the primary resonant coil C1.

The secondary core unit 3 includes a flat plate-like secondary ferrite core FC2, a secondary resonant coil C2 wound around the secondary ferrite core FC2, and a secondary capacitor (not illustrated) connected to the secondary resonant coil C2. The primary and secondary core units 2, 3 correspond to the core units in the claims, and the primary and secondary ferrite cores FC1, FC2 correspond to the cores in the claims, and primary and secondary resonant coils C1, C2 correspond to the pair of coils in the claims.

Each of the primary and secondary ferrite core FC1, FC2 described above is a rectangular flat panel in a plan view, which is configured from, for example, ferrite that is a magnetic material, and is horizontally disposed. The primary and secondary ferrite cores FC1, FC2 face each other in the vertical direction when supplying the power. In the present embodiment, as described above, although an example in which the core is configured from the ferrite will be described, the core may be configured from any magnetic material having high magnetic permeability and low dielectric constant, and is not limited to the ferrite.

The primary and secondary resonant coils C1, C2 are configured of litz wire, and are wound so that an axial direction Y1 is in parallel with the primary and secondary ferrite cores FC1, FC2. The primary and secondary capacitors (not illustrated) are capacitors that are respectively connected to the primary and secondary resonant coils C1, C2 in series or parallel for adjusting a resonant frequency, and work as a resonant circuit with the primary and secondary resonant coils C1, C2.

Further, the primary and secondary ferrite cores FC1, FC2 of the reference example, as illustrated in FIG. 2, are divided into two portions respectively along dividing lines L1, L2 along the axial direction Y1 of the primary and secondary resonant coils C1, C2. Incidentally, in the reference example, each of the primary and secondary ferrite cores FC1, FC2 is equally divided into two portions along the axial direction Y1, so that a width W1 of one side and the other side of the dividing lines L1, L2 are equal.

According to the power supplying system 1 described above, a vehicle stops in the power source supplying facility to be disposed separately in a direction perpendicular to the axial direction Y1 of the primary and secondary resonant coils C1, C2. In this state, when supplying an AC current of the resonant frequency from the AC power supply V to the primary core unit 2, the primary resonant coil C1 and the primary capacitor resonate with each other. As a result, the primary core unit 2 and the secondary core unit 3 magnetically resonate with each other, and power is wirelessly transmitted from the primary core unit 2 to the secondary core unit 3, and then the power is supplied via a rectifier 4 to the load L connected to the secondary core unit 3.

According to the reference example described above, the primary and the secondary ferrite cores FC1, FC2 are divided into a plurality of portions along the axial direction Y1 of the primary and secondary resonant coils C1, C2. As a result, decrease of power transmission efficiency can be suppressed even when dividing the primary and secondary ferrite cores FC1, FC2.

Next, the present inventors, in order to confirm the effect, have performed a simulation of the power loss distribution in the surfaces of the primary and secondary ferrite cores FC1, FC2, and power transmission efficiency between the primary and secondary core units 2, 3, for a conventional product that is a power supplying system 1 in which the primary and secondary ferrite cores FC1, FC2 are not divided, a reference product A in which the primary and secondary ferrite cores FC1, FC2 are divided into two portions along the axial direction Y1 as illustrated in FIG. 2, and a comparative product A in which the primary and secondary ferrite cores FC1, FC2 are equally divided into two portions along the direction perpendicular to the axial direction Y1.

Incidentally, in this case, the conventional product and the reference product A are different from each other only in whether or not the primary and secondary ferrite cores FC1, FC2 are divided, and are the same in any other conditions (for example, size of the primary and secondary ferrite cores FC1, FC2, and material and number of turns of the primary and secondary resonant coils C1, C2). Further, the reference product A and the comparative product A are different from each other only in the dividing direction of the primary and secondary ferrite cores FC1, FC2, and are the same in any other conditions, and have been simulated in the case that the gap G between the divided two portions is 1 mm. Simulation results of the power loss are illustrated in FIG. 3 to FIG. 5.

Figure 3:
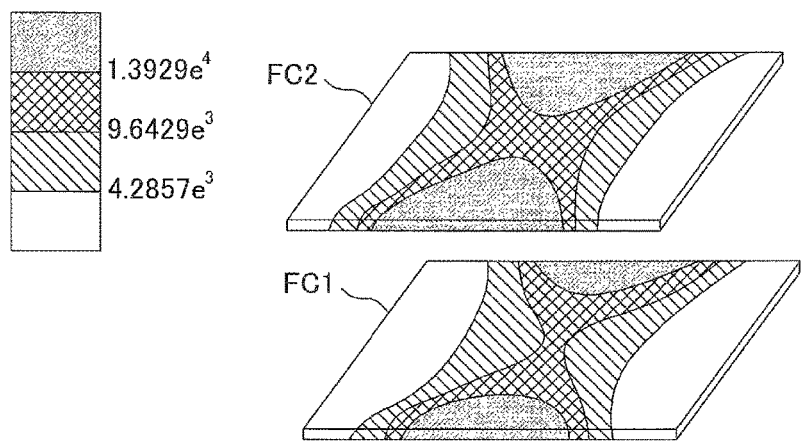
FIG. 3 illustrates power loss distribution in primary and secondary ferrite core surfaces of a conventional product.
Figure 4:
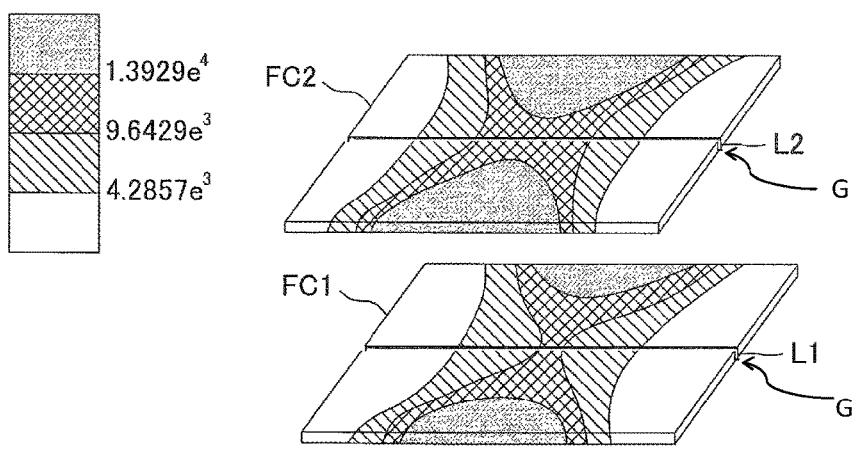
FIG. 4 illustrates power loss distribution in primary and secondary ferrite core surfaces of a reference product A that is a power supplying system of the reference example.
Figure 5:
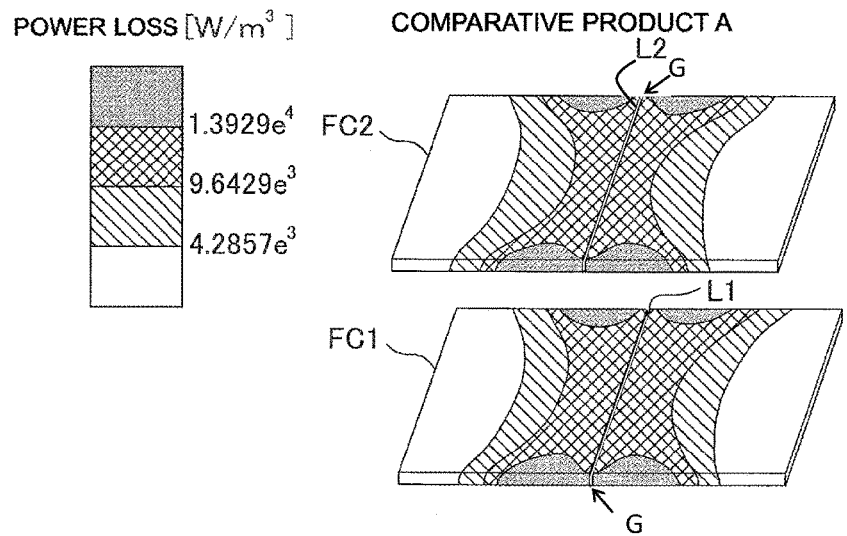
FIG. 5 illustrates power loss distribution in primary and secondary ferrite core surfaces of a comparative product A.

Incidentally, in each of FIG. 3 to FIG. 5, the power loss of the upper surfaces of the primary and secondary ferrite cores FC1, FC2 is illustrated. Incidentally, it has been confirmed that the power loss of the lower surface of the primary ferrite core FC1 not illustrated in FIG. 3 to FIG. 5 (opposite surface to the secondary ferrite core FC2) is almost the same as that of the upper surface of the secondary ferrite core FC2 illustrated in FIG. 3 to FIG. 5 (opposite surface to the primary ferrite core FC1). Further, it has been confirmed that the power loss of the secondary ferrite core FC2 not illustrated in FIG. 3 to FIG. 5 (surface that faces the primary ferrite core FC1) is almost the same as that of the upper surface of the primary ferrite core FC1 illustrated in FIG. 3 to FIG. 5 (surface that faces the secondary ferrite core FC2).

As it is apparent from a comparison between FIG. 3 and FIG. 5, in the comparative product A, although the power loss of the surfaces that do not face each other of the primary and secondary ferrite cores FC1, FC2 has been better than the conventional product, the power loss of the surfaces that face each other of the primary and secondary ferrite cores FC1, FC2 has been worse than the conventional product. As a result, the power transmission efficiency of the conventional product is 97.20%, and that of the comparative product A is 97.08%, and the power transmission efficiency is decreased.

On the other hand, as illustrated in FIG. 4, the reference product A can make the power loss distribution be almost the same as that of the conventional product. Further, the transmission efficiency of the reference product A is 97.19%, which is higher than that of the comparative product A, and can be made to be almost the same as that of the conventional product. That is, it has been confirmed that the reference product A can obtain almost the same transmission efficiency as the conventional product although the primary and secondary ferrite cores FC1, FC2 are divided, and suppress the decrease of the power transmission efficiency even when the primary and secondary ferrite cores FC1, FC2 are divided.

First Embodiment

Figure 6:
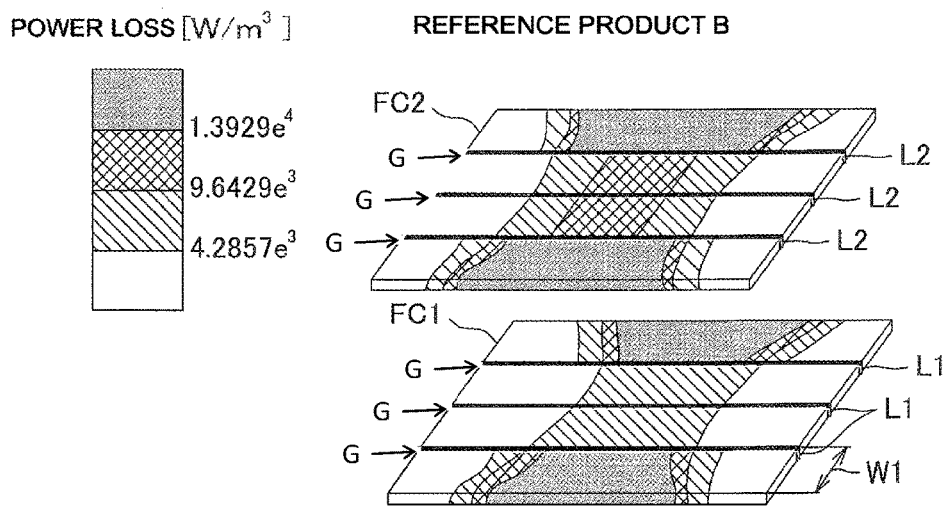
FIG. 6 illustrates power loss distribution in primary and secondary ferrite core surfaces of a reference product B in a first embodiment.
Figure 7:
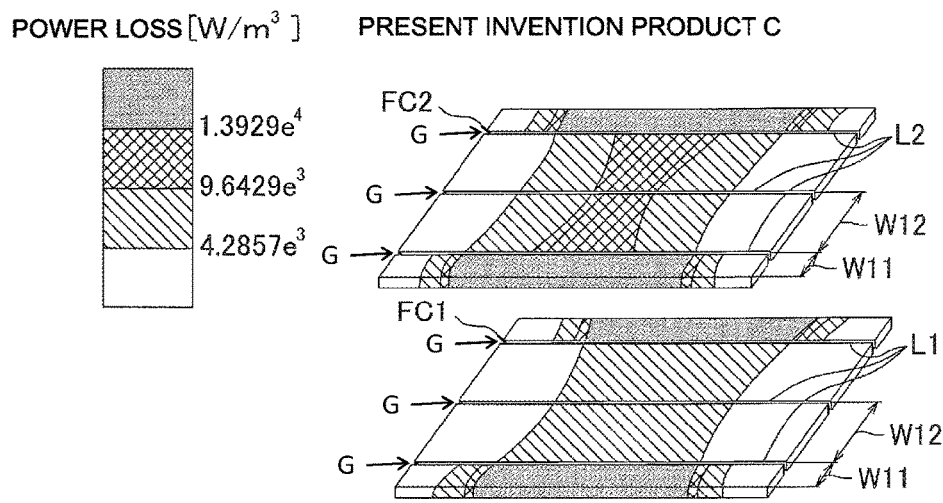
FIG. 7 illustrates power loss distribution in primary and secondary ferrite core surfaces of a present invention product C in the first embodiment.

Next, a first embodiment will be described with reference to FIG. 6 and FIG. 7. A significant difference between the reference example and the first embodiment is the number of divisions of the primary and secondary ferrite cores FC1, FC2. In the reference example, the primary and secondary ferrite cores FC1, FC2 have been equally divided into two portions, however, in the first embodiment, the primary and secondary ferrite cores FC1, FC2 are divided into four portions along the axial direction Y1, as illustrated in FIG. 6 and FIG. 7, for example. In this case, as illustrated in FIG. 6, the primary and secondary ferrite cores FC1, FC2 may be equally divided into four portions and may also be divided so that, as illustrated in FIG. 7, a width W11 of the divided both end portions is shorter than a width W12 of the center portion.

Next, the present inventors, in order to confirm the effect of the first embodiment, have performed simulation of the power loss distribution in the surfaces of the primary and secondary ferrite cores FC1, FC2, and the power transmission efficiency between the primary and secondary core units 2, 3, for a reference product B that is a power supplying system 1 in which the primary and secondary ferrite cores FC1, FC2 are equally divided into four portions along the axial direction Y1, and a present invention product C that is a power supplying system 1 in which the primary and secondary ferrite cores FC1, FC2 are divided into four portions along the axial direction so that the width W11 is shorter than the width W12.

Incidentally, in this case, the reference product B and the present invention product C are different from each other only in whether or not the primary and secondary ferrite cores FC1, FC2 are equally divided, and are the same in any other conditions. Simulation results of the power loss are illustrated in FIG. 6 and FIG. 7.

As it is apparent from a comparison between FIG. 3 and FIG. 6, the power loss of the primary and secondary ferrite cores FC1, FC2 of the center portion can be suppressed lower in the reference product B than in the conventional product. On the other hand, the power loss of the both end portions is worse in the reference product B than in the conventional product, and the transmission efficiency is 97.17%. Although this is a little lower than that of the conventional product (97.20%) and the reference product A (97.19%) described above, it is in a range that can be said is the same level, and higher than that of the comparative product A (97.08%).

Further, as illustrated in FIG. 7, in the present invention product C, it is possible to make the region larger of the center portion in which the power loss is low and to make the region smaller of the both end portions in which the power loss is high, by making the width W11 be smaller than the width W12, and the transmission efficiency is 97.18%. Although this is a little lower than that of the conventional product (97.20%) and the reference product A (97.19%), it is in a range that can be said is the same level, and it has been confirmed that it is higher than the comparative product A (97.08%) and the reference product B (97.17%).

That is, it has been confirmed that, although the primary and secondary ferrite cores FC1, FC2 are divided, the reference product B, C can obtain almost the same transmission efficiency as that of the conventional product, and even when the primary and secondary ferrite cores FC1, FC2 are divided, decrease of the power transmission efficiency can be suppressed.

Further, it has been found that, when the primary and secondary ferrite cores FC1, FC2 are divided into three or more portions along the axial direction Y1, the decrease of the power transmission efficiency can be suppressed more when the width of the both end portions W11 is shorter than the width of the center portion W12.

Second Embodiment

Figure 8:
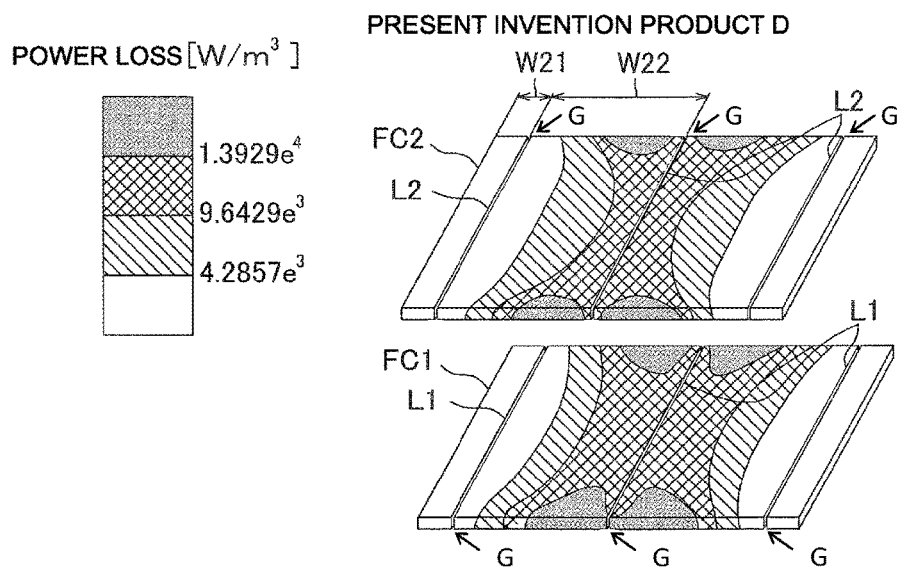
FIG. 8 illustrates power loss distribution in primary and secondary ferrite core surfaces of a present invention product D in a second embodiment.

Next, a second embodiment will be described with reference to FIG. 8 and FIG. 9. A significant difference between the first embodiment and the second embodiment is a dividing direction of the primary and secondary ferrite cores FC1, FC2. In the first embodiment, the primary and secondary ferrite cores FC1, FC2 have been unequally divided along the axial direction Y1, however, in the second embodiment, as illustrated in FIG. 8, the primary and secondary ferrite cores FC1, FC2 are unequally divided in the direction perpendicular to the axial direction Y1. In this case too, the cores are divided so that a width W21 of the both end portions is shorter than a width W22 of the center portion of the primary and secondary ferrite cores FC1, FC2.

Next, the present inventors, in order to confirm the effect of the second embodiment, have performed a simulation of the power loss distribution in the surfaces of the primary and secondary ferrite cores FC1, FC2, and the power transmission efficiency between the primary and secondary core units 2, 3, for a present invention product D that is a power supplying system 1 in which the primary and secondary ferrite cores FC1, FC2 are divided into four portions along the direction perpendicular to the axial direction Y1 so that the width W21 is shorter than the width W22, and a comparative product B that is a power supplying system 1 in which the primary and secondary ferrite cores FC1, FC2 are equally divided along the direction perpendicular to the axial direction Y1 (all of the width W2 are equal).

Incidentally, in this case, the present invention product D and the comparative product B are different from each other only in whether or not the primary and secondary ferrite cores FC1, FC2 are equally divided, and are the same in any other conditions. Simulation results of the power loss are illustrated in FIG. 8 and FIG. 9.

Figure 9:
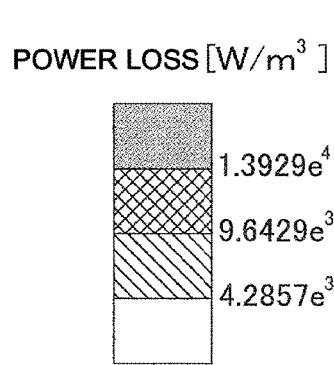
FIG. 9 illustrates power loss distribution in primary and secondary ferrite core surfaces of a comparative product B.
Figure 9:
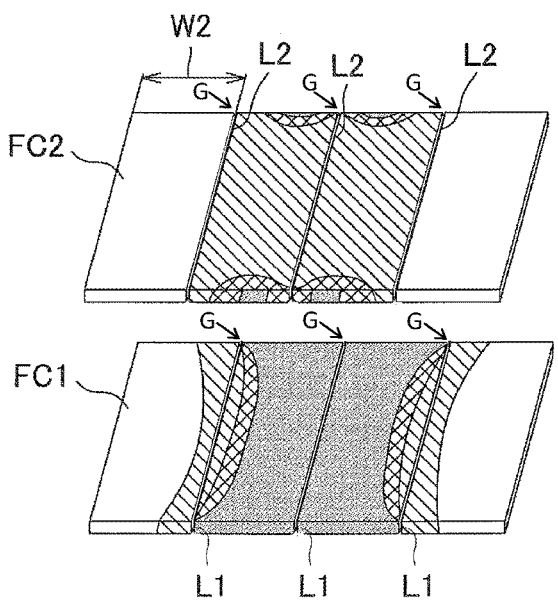

As it is apparent from a comparison between FIG. 8 and FIG. 9, in the present invention product D, it is possible to make the region larger of the center portion in which the power loss is low, and make the region smaller of the both end portions in which the power loss is high, by making the width W21 be smaller than the width W22, and the transmission efficiency is 96.98%. It has been confirmed that it is higher than that of the comparative product B (96.82%).

That is, it has been found that, when the primary and secondary ferrite cores FC1, FC2 are required to be divided into three or more portions along the direction perpendicular to the axial direction Y1, the decrease of the power transmission efficiency can be suppressed more when the width W21 of both end portions is shorter than the width W22 of the center portion.

Further, according to the embodiments described above, although power has been supplied to the primary core unit 2 directly from the AC power supply V, the present invention is not limited thereto, and for example, the power may be contactlessly supplied by electromagnetic induction. Further, although power has been supplied to the load L directly from the secondary core unit 3, the present invention is not limited thereto, and for example, the power may be contactlessly supplied by electromagnetic induction.

Further, the embodiments described above have shown merely exemplary form of the present invention, and the present invention is not limited to the embodiments. That is, it can be implemented in various modifications without departing from the gist of the present invention.

REFERENCE SIGNS LIST

1 power supplying system
2 primary core unit (core unit)
3 secondary core unit (core unit)
C1 resonant coil (coil)
C2 resonant coil (coil)
FC1 primary ferrite core (core)
FC2 secondary ferrite core (core)
W11 width of both end portions
W12 width of center portion
W21 width of both end portions
W22 width of center portion
Y1 axial direction

What is claimed is:

1. A coil unit used for a power supplying system that, when a pair of coils is separately disposed in a direction perpendicular to an axial direction of the coils, contactlessly supplies power from one coil to the other coil, the coil unit comprising:
   a flat panel-like core; and
   the pair of coils wound around the core,
   wherein the core is divided, along the axial direction of the coils, into at least three portions, with gaps therebetween, and
   wherein the core is divided to form two end portions, parallel to the axial direction of the coils and at opposite ends of the core, such that a width of at least one of both end portions, perpendicular to the axial direction of the coils, is smaller than a width another portion of the core different from the two end portions.

2. A power supplying system comprising the pair of the coil units described in claim 1, configured to perform contactless power supplying between the pair of the coil units.

* * * * *